Patented May 20, 1924.

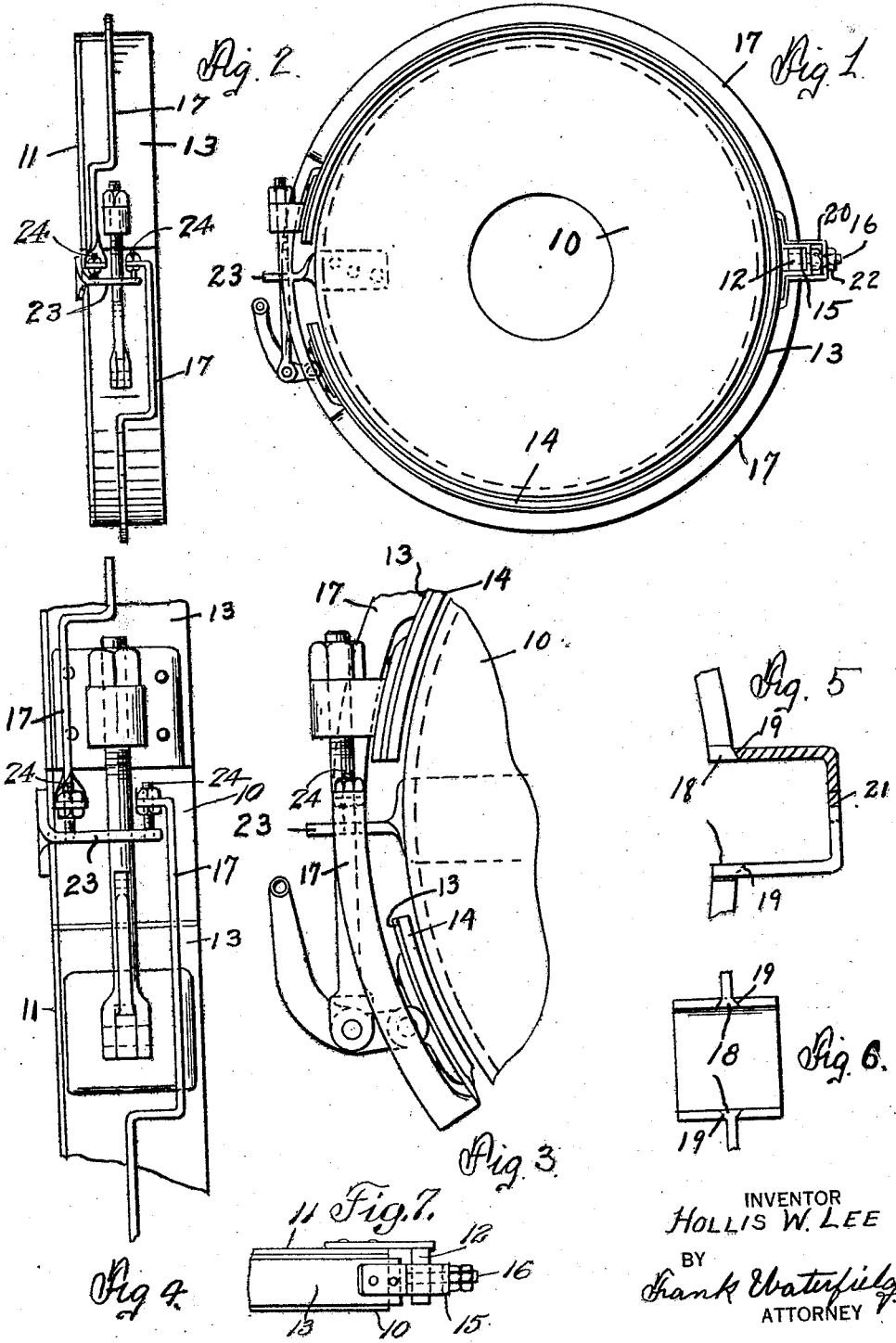

1,494,607

UNITED STATES PATENT OFFICE.

HOLLIS W. LEE, OF FRESNO, CALIFORNIA.

VEHICLE BRAKE.

Application filed October 20, 1921. Serial No. 508,965.

*To all whom it may concern:*

Be it known that I, HOLLIS W. LEE, a citizen of the United States, and resident of Fresno, in the county of Fresno and State of California, have invented new and useful Improvements in Vehicle Brakes, of which the following is a specification.

My invention relates primarily to a brake for use on auto vehicles although it is not limited to such use.

Heretofore in the use of such brakes it has been the practice to form the brake band from flexible metal to which the usual brake lining was secured and the same was held from contacting with the brake drum by spring devices mounted at intervals around the dust shield to extend out over the brake drum and band and which acted to pull the band away from the drum. In applying the brake it was necessary to overcome the tension of these springs and owing to the fact that it was practically impossible to tension the springs exactly alike and maintain them so, the brake band soon became "out of round" resulting in the brake lining contacting with the drum on a portion of its surface only when in use thereby reducing the effectiveness of the brakes materially and causing the lining to wear out much more rapidly than would otherwise be the case. Another objectionable result was due to the fact that as the band was forced out of round the deformed portions of said band remained in contact with the drum resulting in a great loss of power and making proper control of the vehicle difficult.

It is the object of my invention to provide a brake which will overcome the above mentioned objections and which will be cheap, simple and efficient in action.

Another object is to provide means whereby the maximum braking efficiency may be obtained with the minimum effort.

A still further object is to avoid the necessity for all springs and the like at present required to render the brake ineffective when not in use.

Other objects and advantages will appear hereinafter and, while I have shown and will describe the preferred form of my invention it will be understood that I do not limit myself to such preferred form but that various changes and adaptations may be made therein without departing from the spirit of my invention.

In the drawings accompanying and forming a part hereof;

Fig. 1 is a side elevation of my device in its position of use upon the brake drum.

Fig. 2 is a left hand elevation of Fig. 1.

Fig. 3 is an enlarged detailed side elevation of the operating ends of my device.

Fig. 4 is a left hand elevation of Fig. 3.

Figs. 5 and 6 are enlarged details of a portion of my device.

Fig. 7 is a fragmentary view showing the adjustable connection between the brake band and dust shield.

Referring to the drawings my device comprises the brake drum 10 of the usual construction mounted in the usual manner upon the wheel of the vehicle, not shown. 11 indicates the dust shield on the rear axle housing, not shown. 12 is the stud also mounted upon the dust shield which supports the brake band 13. Brake band 13 comprises a flexible band preferably of spring steel upon the inner side of which is mounted the brake lining 14 in the usual manner and having a stirrup or bracket 15 secured upon the outer periphery thereof, centrally of its length, which stirrup is mounted to straddle stud 12 and is held positioned thereon by means of a screw 16, which screw also provides means for adjusting said brake band relative to the drum. The free ends of brake band 13 are connected to the usual operating means.

Surrounding brake band 13 I provide two semi-circular members 17 which are non-flexible and each of these members 17 has one of its ends headed, as shown at 18 in Figs. 5 and 6, and these heads are loosely mounted in recesses 19 in a stirrup 20 mounted upon stirrup 15, a hole 21 being provided therein through which passes the outer end of screw 16, a nut 22 being provided to retain said stirrup 20 in its operative position. The other ends of said members 17 are bent at a right angles and are adjustably connected to the upper face of guide member 23 mounted upon the dust shield 11, by means of screws 24.

In the use of my device the brake band will first be formed with a diameter such as will be slightly larger than the diameter of the brake drum so that its tendency will always be to move away from said drum. The members 17 will then be adjusted to permit said band to open sufficient to clear the drum the desired amount only, said members acting to limit the opening of said band beyond the predetermined amount. As the lining wears screws 24 will be adjusted to move the ends of members 17 together to further limit the opening of the brake band and to take up the amount of wear in said lining.

Having described my invention what I claim is:

1. A brake for vehicles comprising a drum, and a dust shield; a flexible brake band surrounding said drum, except at the front thereof, adapted by its own resiliency to maintain spaced relation therewith; an adjustable connection between said band, centrally of its length, and said dust shield; means connecting the free ends of said band adapted, when operated, to bring said band into contact with said drum; a pair of arcuate stationary members mounted to surround said brake drum to limit the opening movement thereof; a bracket extending from said shield at the front of said drum; and connections between the free ends of said stationary members and said bracket for varying the spaced relation between said drum and brake band.

2. A brake for vehicles comprising a drum and a dust shield; a flexible brake band surrounding said drum except at the front thereof adapted by its resiliency to maintain a spaced relation therebetween; an adjustable connection between said brake band, centrally of its length, and said shield; means to cause said band to engage said drum; a stationary ring mounted to surround said brake band and to limit the opening movement thereof; and means to adjust said stationary ring to vary the spaced relation between said drum and brake band.

In witness that I claim the foregoing I have hereunto subscribed my name this 12th day of September 1921.

HOLLIS W. LEE.